United States Patent [19]

Rees et al.

[11] 4,243,364
[45] Jan. 6, 1981

[54] SAFETY MECHANISM FOR INJECTION-MOLDING MACHINE PROVIDED WITH TAKE-OFF MEMBER

[75] Inventors: Herbert Rees, Willowdale; Paul Brown, Orangeville; Miroslav Grund, Brampton, all of Canada

[73] Assignee: Husky Injection Molding Systems Inc., Bolton, Canada

[21] Appl. No.: 94,455

[22] Filed: Nov. 15, 1979

[51] Int. Cl.² .......................... B29C 7/00; B29F 1/14
[52] U.S. Cl. .................................. 425/153; 425/556; 425/436 R; 425/444
[58] Field of Search ............... 425/153, 157, 137, 547, 425/436 R, 436 RM, 444, 422, 156, 437

[56] References Cited

U.S. PATENT DOCUMENTS

| 2,582,891 | 1/1962 | Strauss | 425/157 X |
|---|---|---|---|
| 2,675,583 | 4/1954 | Scherry | 425/422 X |
| 2,739,349 | 3/1956 | Strauss | 425/156 X |
| 2,923,976 | 2/1960 | Strauss | 425/547 |
| 3,040,378 | 6/1962 | Rodgers et al. | 425/437 X |
| 3,081,486 | 3/1963 | Skvorc | 425/436 X |
| 3,142,863 | 8/1964 | Mazzoni | 425/437 X |
| 3,359,598 | 12/1967 | Bucy | 425/153 |
| 3,907,483 | 9/1975 | York | 425/436 R |
| 3,947,208 | 3/1976 | Broderick | 425/436 R |
| 4,163,540 | 8/1979 | Cafarelli | 425/444 X |

*Primary Examiner*—J. Howard Flint, Jr.
*Attorney, Agent, or Firm*—Karl F. Ross

[57] ABSTRACT

A take-off plate, mounted near one of two relatively movable mold portions and insertable therebetween to remove freshly molded workpieces, enters a slot of a guide block rigid with the same mold portion upon moving from a retracted to an inserted position, the guide block also having a bore intersecting the slot and extending in the direction of mold motion. A pin on the other mold portion traverses the bore upon closure of the mold to prevent untimely insertion of the take-off plate; conversely, the take-off plate in its inserted position obstructs the bore to prevent premature mold closure.

5 Claims, 6 Drawing Figures

SAFETY MECHANISM FOR INJECTION-MOLDING MACHINE PROVIDED WITH TAKE-OFF MEMBER

FIELD OF THE INVENTION

Our present invention relates to a workpiece-shaping machine wherein a take-off member is movable perpendicularly to the mold-opening stroke for insertion between two mold portions in a mold-open position to extract freshly molded workpieces therefrom.

BACKGROUND OF THE INVENTION

An injection-molding machine provided with such a take-off member has been disclosed in commonly owned U.S. Pat. Nos. 3,454,991 and 3,700,375. The mechanism described in these patents includes a cam and a cam follower respectively mounted on the two mold portions in order to correlate the insertion and retraction of the take-off member with the relative displacement of the mold-carrying platens. Such a camming mechanism, which positively prevents any malfunction due to premature closure of the mold or to a delayed retraction of the take-off member, is practical only with machines having a relatively short mold-opening stroke. With elongate workpieces, such as vials or bottle preforms, the equipment tends to become unduly cumbersome.

OBJECT OF THE INVENTION

The object of our present invention, therefore, is to provide means for properly correlating the displacement of two relatively movable platens or other mold holders with the insertion and retraction of a take-off member to avoid any malfunctions even when their drives are not mechanically interlinked.

SUMMARY OF THE INVENTION

We realize this object, pursuant to our present invention, by the provision of lockout means including a control element on one of the holders with a trajectory which intersects the path of a coacting element on the take-off member, thereby preventing any significant movement of the latter from its retracted toward its insertion position when the holders are displaced from the mold-open position while conversely preventing any significant displacement of the platens from their mold-open position when the take-off member is moved out of its retracted position.

Pursuant to a more specific feature of our invention, the holder carrying the take-off member is provided with guide means defining part of the path of that member and of the trajectory of the control element carried by the other platen.

BRIEF DESCRIPTION OF THE DRAWING

The above and other features of our present invention will now be described in detail with reference to the accompanying drawing in which.

SPECIFIC DESCRIPTION

Figure 1:
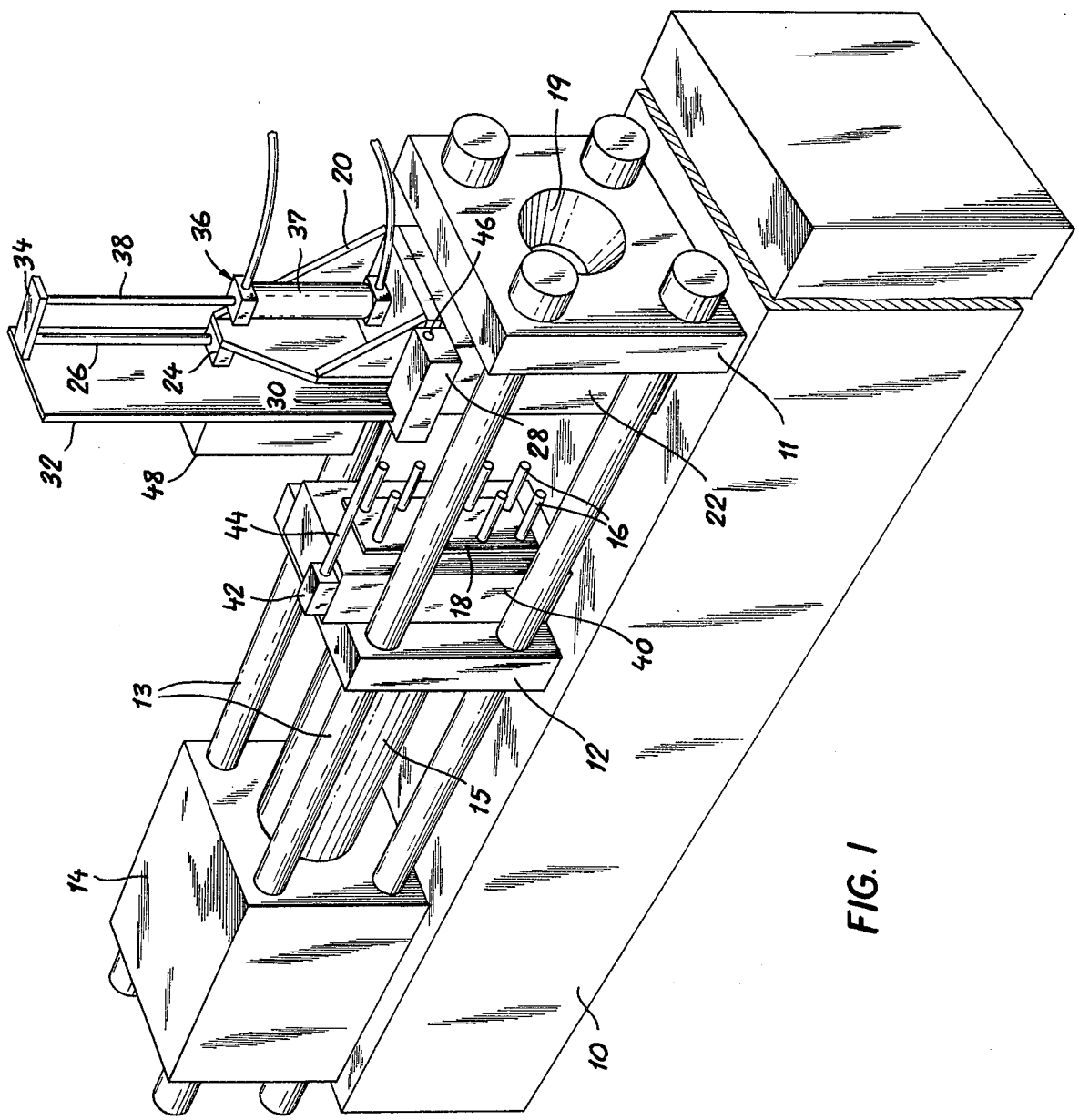
FIG. 1 is a somewhat diagrammatic view of the principal parts of an injection-molding machine equipped with a safety mechanism according to our invention.
Figure 2:
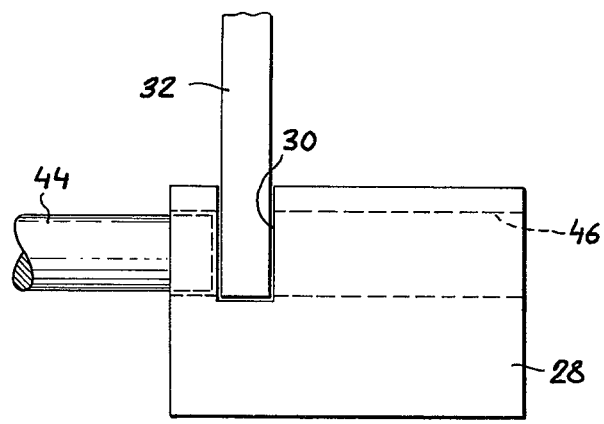
FIG. 2 is a top view of a guide block coacting with a take-off plate in the machine of FIG. 1.

In FIG. 1 we have shown an injection-molding machine comprising a base 10 carrying a fixed platen 11 and a movable platen 12 riding on a set of tie bars 13 which terminate at a housing 14. The latter contains conventional means for reciprocating a ram 15 secured to platen 12. Two complementary mold portions 22 and 40 are respectively carried on these platens; the stationary mold portion 22 has a set of cavities 17, shown in FIG. 6, whereas the movable mold portion 40 carries an array of elongate cores 16 receivable in these cavities. A stripper plate 18 on mold portion 40 is movable by a conventional ejector mechanism, not shown, to remove the molded tubular workpieces adhering to the cores 16 when the platens are in their illustrated mold-open position. An injection orifice 19 in platen 11 communicates with the usual heating and compression equipment, omitted here for clarity, which feeds liquefied plastic material to the cavities of mold plate 22. Mounted on mold portion 22, and therefore rigid with platen 11, is a frame 20 with several aligned lugs 24 (only one shown) for the guidance of a vertical rod 26 terminating in a bracket 34 at its top and a similar, nonillustrated bracket at its bottom which are secured to a vertical take-off plate 32. A pneumatic jack 36 on frame 20 comprises a double-acting cylinder 37 whose piston is connected with bracket 34 via a piston rod 38. A guide block 28, fixed securely to frame 20, has a slot 30 accommodating a vertical edge portion of plate 32 and a horizontal bore 46, paralleling the direction of mold movement, which intersects the slot 30 and is aligned with a rod 44 projecting from a mounting 42 on mold portion 40. In the position illustrated in FIG. 1, with the mold wide open and the plate 32 fully retracted, the lower plate edge just clears the bore 42, as illustrated in FIG. 3, while the tip of rod 44 terminates just short of slot 30, as seen in FIGS. 2 and 4, yet both are engaged by the block 28.

Figure 4:
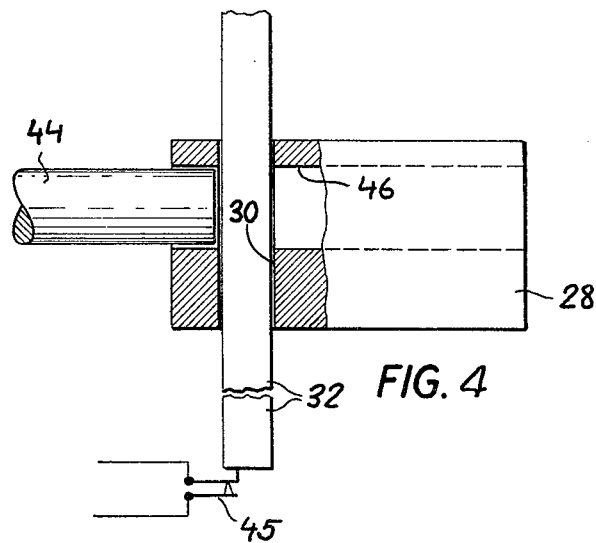
Figure 5:
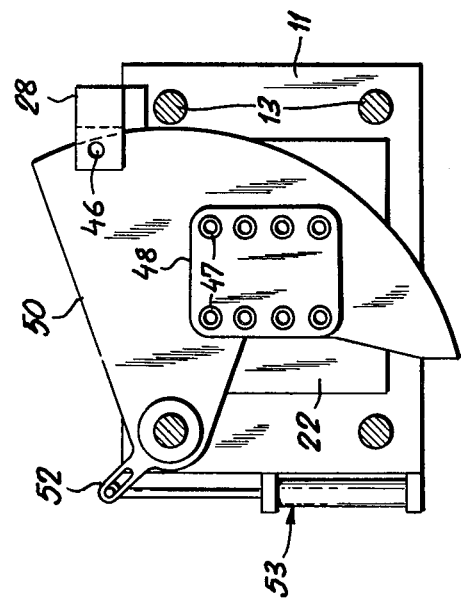
FIG. 5 is a face view of a modified take-off plate for the machine of FIG. 1, shown in an inserted position.

A nonillustrated limit switch inside housing 14 detects the mold-open position and trips a solenoid valve for admitting compressed air to the upper port of cylinder 37 for lowering the take-off plate 32 into the space between the mold portions 22, 40, such motion being unobstructed by the blocking rod in the position of FIG. 4. A receptacle 48 on plate 32 has nests 49 (see FIG. 6) confronting respective cores 16 on mold portion 40 when the take-off plate is in its inserted position at the lower end of its stroke; at this point the plate 32 closes a limit switch 45, FIG. 4, which actuates the ejection mechanism to thrust the stripper plate 18 forward whereby the workpieces on these cores, designated 47 in FIG. 5, are transferred to the nests 49. Upon the subsequent return of the stripper plate to its normal position adjacent mold portion 40, another limit switch (not shown) causes pressurization of the lower port of cylinder 37 whereby the loaded take-off plate 32 is raised into its withdrawn position where the extracted workpieces are removed from the receptacle 48 by a nonillustrated transfer device including, for example, a set of suction tubes reaching into the nests 49. The arrival of plate 32 in its illustrated top position trips a further nonillustrated limit switch which actuates the mold drive inside housing 14 to reclose the mold for another injection cycle.

Figure 3:
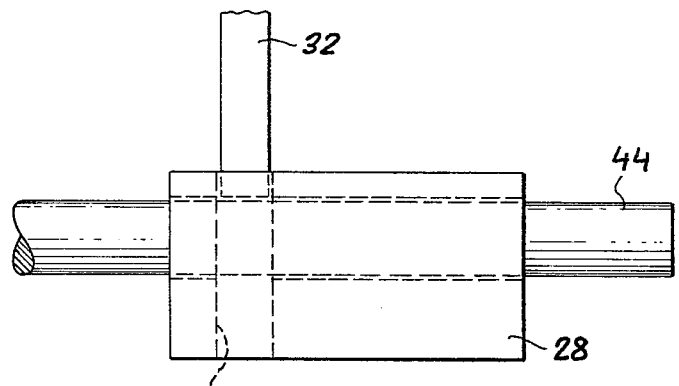
FIGS. 3 and 4 are side-elevational views of the assembly of FIG. 2 in two different positions.

Upon incipient mold closure, rod 44 penetrates further into the bore 46 of guide block 28 and completely traverses the block as shown in FIG. 3. Such penetration prevents any significant lowering of plate 32 and avoids the risk that, possibly because of failure of air pressure in the lower part of cylinder 37, the receptacle 48 may interfere with the travel of mold portion 40. Conversely, the mold-closing operation cannot commence until the plate 32 has cleared the bore 46, as shown in FIG. 3, since otherwise the rod 44 would be immobilized and with it the mold portion 40 and the platen 12. In this connection it is worth noting that modern injection-molding machines use relatively low oil pressure for advancing the movable platen and intensify that pressure only in a terminal phase of the closure stroke; see, for example, commonly owned U.S. Pat. No. 4,017,236. If necessary, however, rod 44 could be designed as a feeler held in its mounting 42 with limited axial mobility so as to be repressed against the force of a spring to trip a relay for halting the mold drive when abutting against the lowered plate 32.

Figure 6:
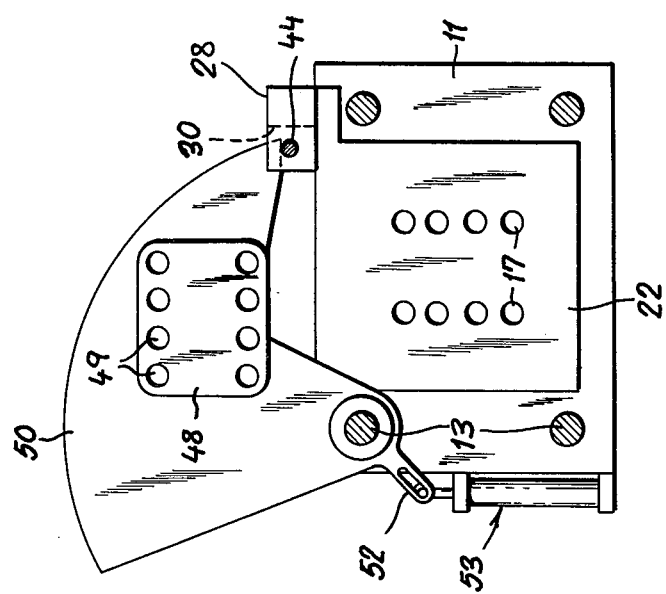
FIG. 6 is a view similar to FIG. 5, showing the take-off plate in its retracted position.

As illustrated in FIGS. 5 and 6, the linearly moving take-off plate 32 of FIGS. 1-4 could be replaced by a swingable plate 50 pivoted on one of the tie bars 13 close to the mold portion 22 so as to be rotatable, e.g. through about 90°, in a plane perpendicular to the direction of relative displacement of the mold portions. Such rotation, between an inserted position (FIG. 5) and a retracted position (FIG. 6), is brought about by a preferably pneumatic jack 53 whose piston rod is articulated to an extension 52 of plate 50. In this instance an arcuate edge of the generally sectoral plate 50 is received in the slot 30 of guide block 28 for alternately clearing and obstructing the bore 46 thereof which, as in the preceding embodiment, is penetrated by the rod 44 upon closure of the mold. Two nonillustrated limit switches, similar to the one shown at 45 in FIG. 4, are alternately closed by plate 50 in the two terminal positions thereof for initiating either the ejection motion of stripper plate 18 (FIG. 1) or the closure of the mold, as described above.

Although our invention has been particularly described with reference to an injection-molding machine, it can also be employed with other equipment wherein a workpiece is extracted after having been shaped by compression, stamping, die-cutting or similar processes. Thus, the term "mold" as herein used is intended to encompass any tool of two or more parts whose separation renders the finished workpiece accessible.

We claim:

1. In a workpiece-shaping machine provided with a pair of relatively movable holders carrying respective mold portions displaceable between a mold-open position and a mold-closed position, the combination therewith of:

a take-off member adjacent one of said holders provided with drive means for moving same from a retracted position into an inserted position between said mold portions in the mold-open position of said holders for extracting freshly molded workpieces from one of said mold portions; and lockout means for preventing any significant movement of said take-off member from said retracted position toward said inserted position with said holders displaced from said mold-open position and preventing any significant displacement of said holders from said mold-open position with said take-off member moved out of said retracted position, said lockout means including a control element on the other of said holders with a trajectory intersecting the path of a coacting element on said take-off member.

2. The combination defined in claim 1 wherein said one of said holders is provided with guide means defining part of said trajectory and of said path.

3. The combination defined in claim 2 wherein said control element is a rod extending in the direction of displacement of said holders said take-off member being a plate with an edge portion constituting said coacting element, said guide means comprising a block with a slot accommodating said edge portion and with a bore in line with said rod traversing said slot.

4. The combination defined in claim 3 wherein said rod has a tip received in said bore in said mold-open position, an extremity of said edge portion being received in said slot in said retracted position.

5. The combination defined in claim 1, 2, 3 or 4 wherein said one of said mold portions is provided with ejection means for transferring said freshly molded workpieces to said take-off member, further comprising switch means responsive to arrival of said take-off member in said inserted position for actuating said ejection means.

* * * * *